Feb. 5, 1963
G. W. ENK
3,076,889
POSITIONING APPARATUS
Filed Feb. 29, 1960
3 Sheets-Sheet 1
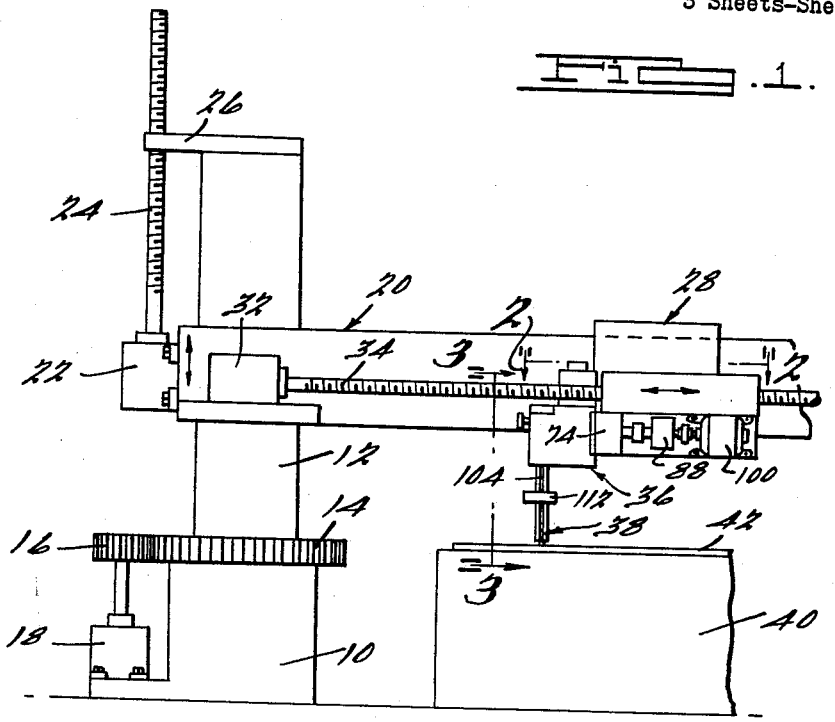
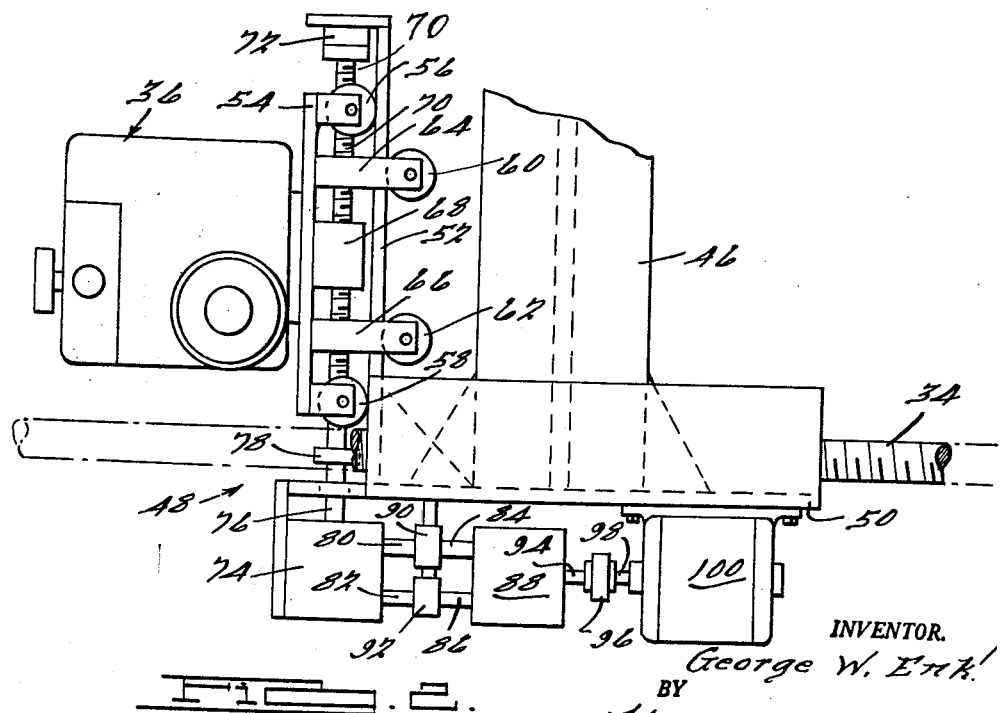
INVENTOR.
George W. Enk
BY
Barnes, Dickey & Pierce
ATTORNEYS.

Feb. 5, 1963
G. W. ENK
3,076,889
POSITIONING APPARATUS
Filed Feb. 29, 1960
3 Sheets-Sheet 2
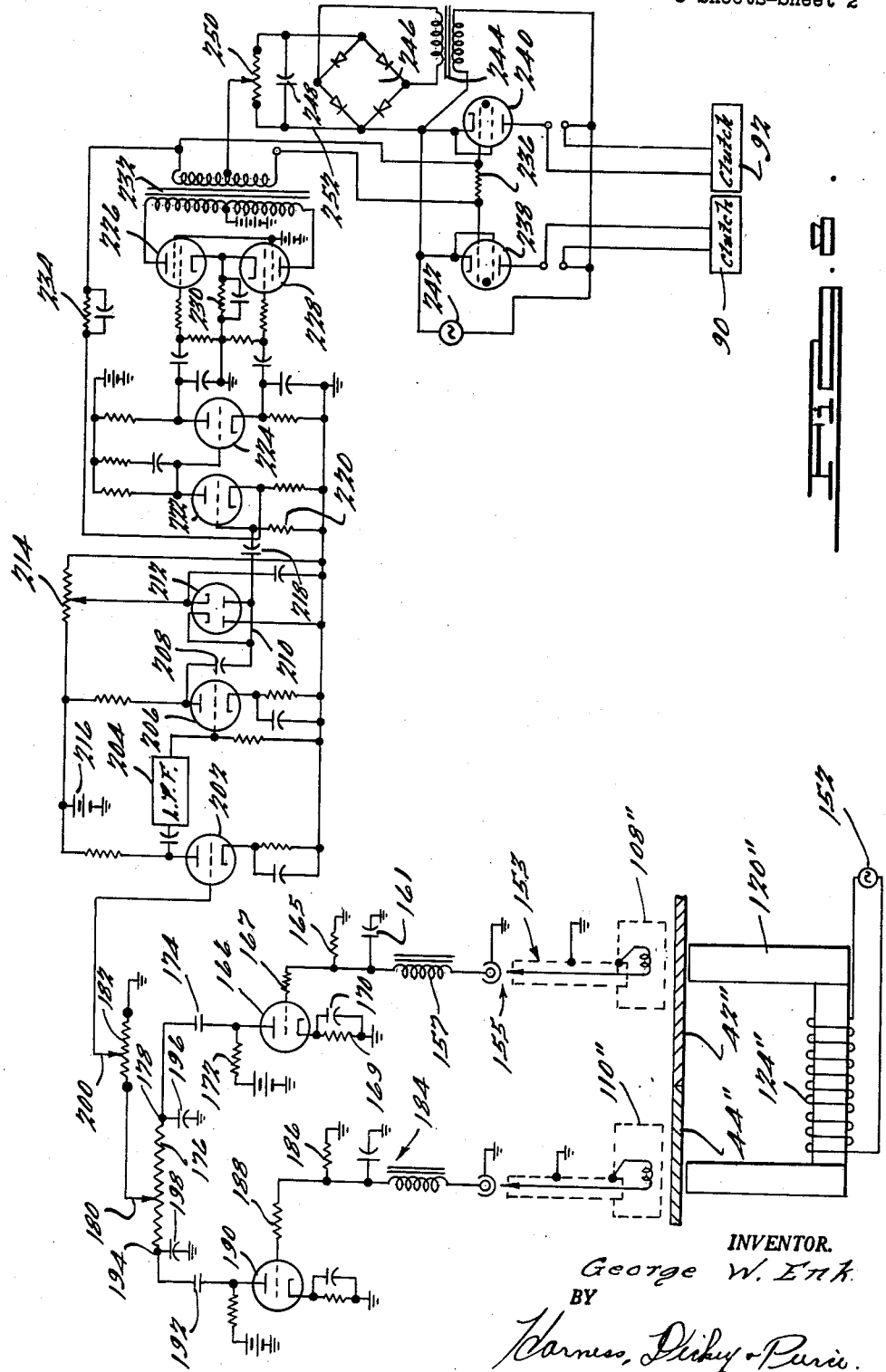
INVENTOR.
George W. Enk
BY
Harness, Dickey & Pierce
ATTORNEYS Feb. 5, 1963    G. W. ENK    3,076,889
POSITIONING APPARATUS
Filed Feb. 29, 1960    3 Sheets-Sheet 3
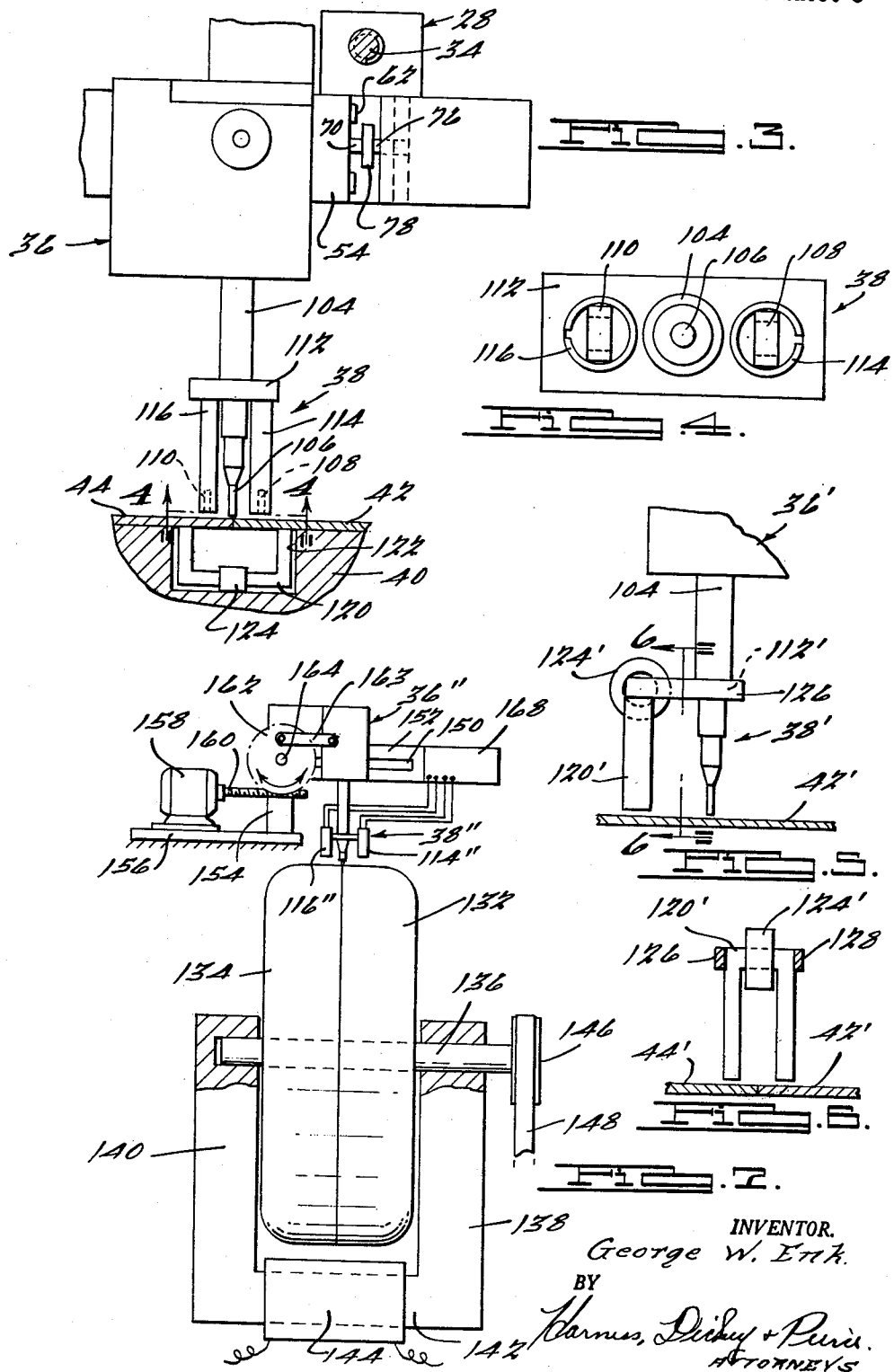
INVENTOR.
George W. Enk.
BY
Harness, Dickey & Pierce
ATTORNEYS.

United States Patent Office 3,076,889
Patented Feb. 5, 1963

3,076,889
POSITIONING APPARATUS
George W. Enk, 2037 Livernois, Ferndale, Mich.
Filed Feb. 29, 1960, Ser. No. 11,875
26 Claims. (Cl. 219—125)

This invention relates to positioning apparatus, and more particularly to apparatus for moving a member parallel with the line of abutment between two metallic parts.

The object of this invention is to move a member along the line of abutment between two metallic parts with improved accuracy.

Another feature of this invention is an improved means for detecting the position of the line of abutment of two metallic parts.

A feature of this invention is an improved means for sensing the location of that portion of the line of abutment between two metallic parts which is directly proximate to a member being moved along that line of abutment.

Another feature of this invention is an improved means for guiding an arc welding electrode along the line of abutment of two metallic parts for arc welding those two parts together.

Other features of this invention are improved means for generating an alternating current electrical signal having a characteristic which varies in accordance with the lateral relationship between an arc welding electrode and the line of abutment of two metallic parts, and control apparatus including improved means for discriminating in favor of that signal and discriminating against electrical signals produced as a result of the arc welding operation.

Another feature of this invention is a control apparatus responsive to an alternating current signal indicative of the direction of the deviation of an arc welding electrode from a desired position and including a pair of electron discharge devices energized by an alternating voltage of the same frequency as the frequency of the signal for actuating drive mechanism for moving the electrode in the opposite direction.

Another feature of this invention is an improved apparatus, including improved differential gearing controlled by selectively actuatable electro-mechanical clutching devices, for driving a member relative to the line of abutment of two metals.

Another feature of the invention is an improved sensing coil assembly.

Other objects and features of the invention will be apparent fro mthe following detailed description of embodiments of the invention when read with reference to the accompanying drawings, in which:

FIGURE 1 is a fragmentary side elevational view of an arc welding apparatus including a control apparatus embodying certain of the principles of the present invention;

FIG. 2 is a fragmentary sectional view taken generally along the line 2—2 of FIG. 1;

FIG. 3 is a fragmentary sectional view taken substantially along the line 3—3 of FIG. 1;

FIG. 4 is a sectional view taken substantially along the line 4—4 of FIG. 3;

FIG. 5 is a fragmentary side elevational view of a modification of a portion of the control apparatus of FIGS. 1–3;

FIG. 6 is a fragmentary sectional view taken substantially along the line 5—5 of FIG. 4;

FIG. 7 is an elevational view, in partial section, of a modified apparatus embodying certain of the features of the present invention, and FIG. 8 is a schematic representation of electrical apparatus suitable for use in conjunction with the apparatus of FIGS. 1–7 and embodying certain of the features of the present invention.

A machine embodying certain of the features of the invention is represented in a generally functional form in FIG. 1 of the drawings. Certain of the mechanical elements are basically similar to corresponding portions of commercially available arc welding machines and commercially available radial drills, and many of the mechanical refinements employed in such units may be utilized to advantage in the present structure.

In general, the structure comprises a base 10 rotatably supporting a vertical column 12. A ring gear 14, fixed to the column 12, is engageable by a pinion 16 capable of being driven by a reversible motor 18, normally through appropriate reduction gearing. An arm or beam 20 is supported upon the column 12, an appropriate keying arrangement being provided so that the arm 20 may move in translation in a vertical sense upon and with respect to the column 12, but is locked against rotation relative to that column. Hence, rotation of the column 12, as a result of energization of motor 18, will correspondingly rotate the arm 20 about the vertical longitudinal axis of the column 12. Suitable clamping means may be provided for selectively locking the column 12 against rotation relative to the base 10.

The arm 20 may be moved up and down upon the column 12 by suitable means functionally represented as a motor 22, which may include reduction gearing, mounted upon the arm 20 and adapted to rotate a worm 24 threadedly engaging a nut fixed within a top cap 26 mounted upon the column 12.

A carriage 28 is supported by and movable in translation along the length of arm 20. The driving means for producing this movement is represented as a motor 32 driving, preferably through reduction gearing, a worm 34 which threadedly engages a nut fixed to the carriage 28.

The carriage 28 supports a head assembly 36 which carries an arc welding electrode assembly 38. Means (not shown) may be provided, if desired, to adjust the position of the electrode assembly 38 in a vertical sense with respect to the head assembly 36. The head assembly may also carry a wire-feeding mechanism for supplying wire to the welding area, means for supplying an appropriate inert gas, such as helium or argon, to the area of the welding operation, and other elements customarily provided in arc welding apparatus of this nature.

The parts to be welded are supported upon a supporting member 40 which is preferably fixed with respect to the base 10 and disposed in underlying relation to the head assembly 36.

The apparatus of FIG. 1, in which certain of the principles of the invention are embodied, serves to weld two metallic parts together along their line of abutment. The metal parts are disposed upon the supporting member 40 and are shown to comprise (FIG. 3) a pair of metallic plates 42 and 44 disposed in edge-abutting relationship, and the apparatus is intended to run a weld along the line of abutment to butt-weld the two metallic plates 42 and 44 together.

To perform this operation, the arc welding electrode assembly 38 should be moved along the line of abutment of the two metals. If that line of abutment is straight and if the two metallic parts 42 and 44 are clamped to the surface 40 in exactly the correct positions relative to the arm 20, it is possible to advance the welding electrode assembly 38 along the line of abutment simply by energizing motor 32 to advance the head 36 along the arm 20. However, if these idealized conditions do not exist, as if the mating edges of the two parts are curved or if the two metallic parts are not ground or otherwise finished so that the line of abutment is not rectilinear, the position of the welding electrode assembly 38 laterally of the line movement of the head 36 must be intermittently or continuously adjusted if an accurate and proper weld is to be formed along the line of abutment of the two metal parts. The present invention relates to means for adjusting the welding electrode, or some other member, into precise pre-selected relationship with the line of abutment between two metallic parts throughout the course of relative longitudinal motion between the welding electrode and those two parts.

The expression "line of abutment," as employed herein, is intended to mean the elongated area of actual or intended engagement between two metallic parts or members. In the case of two end-abutting metal parts, such as parts 42 and 44 illustrated in FIG. 3, the line of abutment is the elongated area of edge proximity, it being recognized that with normal parts there will not be full and intimate engagement over the entire abutting length of the two parts. In the case of two metal parts which are intended to be lap-welded, the line of abutment is intended to refer to the elongated area of lapping engagement of the two overlapped members. In that situation, of course, the weld is formed along the line at which the edge of one plate meets the face of the other plate. The expression "abutting" is also intended to describe the relationship between two members which are in overlapping abutment, preparatory to lap-welding, as well as to two members which are in edge-to-edge contact in preparation for butt-welding.

The head assembly 36, the arm 20 and the driving means including motor 32 and worm 34 serve as means for moving the welding electrode assembly 38 generally parallel with the line of abutment between the two metal members, and additional means is provided, in accordance with the principles of this invention, for moving the welding electrode assembly 38 laterally with respect to the line of movement of the carriage 28 to continuously adjust the electrode assembly 38 to a pre-selected relationship with the line of abutment of the two metallic parts. The magnitude of the maximum lateral adjustment of the head 36 can be selected in accordance with the requirements which the machine will meet. If the machine is to be used to weld metallic plates, which normally have substantially straight mating edges, the total amplitude of lateral adjustment of the head 36 will not need to be great since compensation will only have to be made for irregularities in the edges of the mating plates or for errors in accurate positioning of the line of abutment of the metals with the axis of movement of the carriage 28. If the machine is to be capable of welding along a line of substantial curvilinearity, and if the machine, as shown in FIG. 1, is adapted to move the carriage 28 rectilinearly, then the magnitude of lateral movement of the head 36 must be selected so as to permit the welding electrode assembly 38 to move laterally an amount equal to or exceeding the greatest departure of the line of abutment of the two metal parts from the straight line of movement of the carriage 28. Of course, a machine may be designed to include means for moving the carriage 28 curvilinearly, such as in the circumstance in which the machine is intended and designed primarily for use in welding two metallic parts together which have a correspondingly curvilinear line of abutment. In any case, the means including the carriage 28 and the motor 32 serves to move the electrode assembly 38 generally parallel with the line of abutment of the metallic plates, by which it is meant that the line of movement of the electrode resulting from this movement of the carriage does not deviate from the line of abutment of the two metallic parts by more than the lateral shift capabilities of the equipment, at least over a range of such generally parallel movement. The lateral adjusting means is then effective to continuously shift the electrode assembly 38 laterally of the line of movement of the carriage 28 to maintain that electrode in accurate pre-selected relationship with the line of abutment of the two parts.

The welding head 36 is supported by the carriage 28 in any suitable fashion such as by means of a supporting bracket 46 (FIG. 2) secured to the carriage 28 and by means of an apparatus 48 for moving the head 36 in a direction transverse to the line of movement of the carriage 28 along the arm 20 (FIG. 1). The arc welding head 36 may take any suitable form, and the illustrated arrangement is purely representative.

The means 48 comprises a plate 50 supported by bracket 46 and supporting a driving mechanism to be described, and a plate 52 supported by means including plate 50 and extending perpendicularly thereto. Arc welding head 36 is supported on and for movement longitudinally of plate 52 by means including a plate 54 to which the head 36 is secured, rollers including rollers 56 and 58 engaging the face of the plate 52 nearest the head 36 and rollers including rollers 60 and 62 engaging the opposing face of the plate 52. These several wheels inhibit motion of the head 36 towards or away from the plate 52, but permit movement of the head 36 parallel with the plate 52. Means are also provided for preventing relative movement of the plate 54 in a vertical sense relative to plate 52. For example, the brackets 64 and 66, which support the rollers 60 and 62, and corresponding brackets engageable with the lower surface of the plate 52, may be utilized to perform this function.

Plate 54 carries a nut assembly 68 threadedly engageable by a worm 70, one end of which is rotatably supported by a bearing assembly 72 and the other end of which is connected to the output shaft 76 of a gear box 74 by means of a coupling assembly 78. Gear box 74 is provided with two input shafts 80 and 82 which are connected to the output shafts 84 and 86, respectively, of a gear box 88 by means of selectively actuatable clutching devices 90 and 92, respectively, which are supported in any suitable fashion upon the plate 50. In a preferred arrangement, clutching devices 90 and 92 are electromagnetic clutches, such as eddy-current clutches or magnetic-particle clutches, in which the energization of an electrical field controls the degree of coupling.

The input shaft 94 of gear box 88 is connected, by means of coupling 96, to the output shaft 98 of a driving motor 100 which is also supported upon the plate 50.

In the operation of this apparatus, motor 100 is continuously energized to rotate its output shaft 98 in one direction so as to rotate the input shaft 94 of gear box 88 in the same direction. Gear box 88 is of conventional type having two output shafts 84 and 86 which are continuously rotated in opposite directions in response to the continuous rotation of the input shaft 94. As will be seen from the following description of a representative control circuit, such as that illustrated in FIG. 8 of the drawings, clutching means 90 and 92 are not concurrently energized at any time during the operation of the device. If neither clutch is energized, then neither input shaft 80 nor input shaft 82 of gear box 74 is rotated. If clutch 90 is energized, input shaft 80 of gear box 74 is rotated in the same direction as output shaft 84 of gear box 88; while, if clutch 92 is actuated, input shaft 82 of gear box 74 is rotated in the same direction as output shaft 86 of gear box 88. The directions of selective rotation of input shafts 80 and 82, therefore, are opposite to one another. If input shaft 80 of gear box 74 is rotated, the output shaft 76 thereof is rotated in one direction to rotate the worm 70 in that same direction; if, alternatively, input shaft 82 of gear box 74 is rotated, the output shaft 76 of that gear box is rotated in the opposite direction to rotate worm 70 in the opposite direction. Therefore, by selective actuation of clutches 90 and 92, the head 36 may be moved in one or the other direction along the plate or rail 52.

It will be appreciated that other driving means than those disclosed may be employed if desired, the only requirement being that means be provided for selectively advancing the head 36 in one direction or the other for a selectable distance in a direction generally perpendicular to the line of movement of the carriage along the arm 20 (FIG. 1).

The electrode assembly 38 comprises a holder 104 supporting an arc welding electrode 106. A pair of sensing coils 108 and 110 are supported in pre-selected fixed or adjustably fixed relation to the electrode 106. In the illustrated arrangement, the sensing coils 108 and 110 are supported a short distance to each side of the electrode and their axes are in plane with and perpendicular to the axis of the electrode, and preferably that plane is perpendicular or substantially perpendicular to the line of motion of the electrode as it moves along the line of abutment of the metal parts as a result of the movement of the carriage 28 along the arm 20 (FIG. 1). In the illustrated arrangement, the lowermost surfaces of the sensing coils are spaced slightly further from the workpieces than the arc welding electrode itself. In a constructed arrangement, for example, the two sensing coils, which were spaced about an inch to each side of the welding electrode, were positioned with their lowermost surfaces about ¼ inch above the bottom of the torch tip.

In the illustrated arrangement, each of the coils 108 and 110 comprises a plurality of turns of wire. In a practical embodiment of the invention, each sensing coil is formed of four thousand turns of No. 42 enamel wire, and the coil was formed on an arbor between spool heads spaced about ³⁄₁₆ inch apart, and the outside diameter of the coil was about ½ inch. The physical sizes or number of turns are, of course, not in any way critical.

The sensing coils 108 and 110 are supported relative to the electrode 106 by means of an assembly including a plate 112 and a pair of tubular support members 114 and 116. The plate 112 is formed with a central aperture to accept a portion of the work holder 104 and two apertures disposed laterally thereof to accept the tubular members 114 and 116.

As may best be seen in FIGS. 3 and 4, the tubular members 114 and 116 are formed of relatively thin walled tubing having a narrow longitudinal slot running their length. While other materials may be employed, it is practicable to use a metal and preferable to use a nonmagnetic metal. Aluminum tubing has proved satisfactory in practice. The sensing coils 108 and 110 are inserted within the lower ends of the tubular members 114 and 116, respectively. They may be secured therein in any fashion, and in a constructed embodiment, a ceramic paste was placed within the lower ends of the tubes and surrounding the coils and was bake-hardened to lock the sensing coils in position.

The tubular members 114 and 116 not only serve to hold the coils 108 and 110 in position, but also serve to shield those coils from the arc. The longitudinal slot serves the purpose of preventing the aluminum tubing from acting effectively as a shorted secondary winding to the coils 108 and 110. The leads from the sensing coils are run to the control circuit in any suitable fashion.

The sensing coils are intended to detect the magnitude of the leakage flux produced adjacent the line of abutment of the two metallic plates as a result of the inclusion of these plates in an alternating electromagnetic circuit, and particularly, to sense the location of the line of abutment of the two plates in the exact region of the electrode rather than in a region ahead of or behind the electrode.

In the arrangement of FIGS. 1 and 3, an alternating current energized electromagnet is mounted in a cavity in the support member 40, in a position to cooperate with the abutting plates 42 and 44 to establish the desired leakage or fringing flux field in the area of the sensing coils. As may best be seen in FIG. 3, a C core 120 is disposed in a cavity 122 in the supporting member 40 in a position such that the two legs of that core engage or substantially engage the respective plates 42 and 44. A coil 124 mounted upon the cross-piece of the C core, when energized with alternating current, induces flux in a circuit including the cross-piece and the two legs of the C core 120, and portions of the two plates 42 and 44 adjacent the line of abutment therebetween. Since the two metal plates do not make perfect engagement at their line of abutment, the reluctance of the magnetic circuit at the line of abutment is higher than it is in the portions of the plates adjacent that line of abutment and consequently there tends to be an increasing stray or fringing flux field adjacent that line of abutment and substantially symmetrical with respect thereto. The sensing coils are disposed in that field and both serve, in effect, as the secondary windings of a transformer of which the flux generating coil is the primary winding. In view of the symmetrical relationship, if the two sensing coils 108 and 110 are positioned in fields of equal intensity, the electrode 106 positioned intermediate these coils will be disposed over the line of abutment. If the two sensing coils are in fields of different intensities, it is an indication that the electrode is out of alignment with the line of abutment, and the relative intensities of the sensed fields will indicate the direction of the misalignment. It will be recognized, of course, that differences in the two sensing coils, differences in the distance between each sensing coil and the electrode, or other such differences may be compensated electrically, as will be described.

While there is a fringing flux field below the two plates 42 and 44, the plates 42 and 44 effectively shield the coils 108 and 110 from that flux field.

It will be appreciated that the sensing coils may be utilized in a similar fashion to sense the line of abutment between two metal plates which are disposed for lap-welding. In that case, there will be one field of fringing flux concentrating about the angle defined by the edge of the upper plate and the upper face of the lower plate and fringing thereabout in a generally symmetrical pattern. The relative intensities of the portions of the field can be sensed by the two sensing coils and used to position the electrode. A similar field will exist adjacent the angle formed by the edge of the lower plate and the under surface of the upper plate, but the sensing coils are shielded from that field by the plates themselves.

It will further be appreciated that with the electromagnet including the C core 120 and the coil 124 disposed below the plates 42 and 44, the intensity of the stray flux adjacent the line of abutment but remote from that electromagnet will be less than it is immediately adjacent the magnet. However, as will be seen, it is not the absolute field intensity which is critical but rather the relative intensities of the two electromagnetic field portions in which the two sensing coils are at any instant disposed which indicates the relationship between the electrode and the line of abutment and from which the signal information is derived to direct the re-adjustment of the position of the electrode relative to the line of abutment.

If desired, the alternating electromagnetic energization of the metal plates to establish the detectable fringing field adjacent the line of abutment thereof may be accomplished by providing a flux generating unit which travels with the electrode in the course of its movement along the line of abutment of the metallic plates, and such an arrangement is presently preferred. For example, as illustrated in the modification of FIG. 5, the C core 120' may be supported either forward or aft of the electrode by means such as a pair of arms 126 and 128 (FIGS. 5 and 6) secured to the plate 112 and secured in any suitable fashion to portions of the C core 120'. In a constructed arrangement, the tips or pole faces of the core 120' were disposed about ⅛ inch above the plates 42' and 44' and about 2 inches to the rear (with respect to the direction of travel) of the electrode and the two core legs were in the order of 2 inches apart. These relationships are, of course, not critical. Upon the energization of the coil 124', flux is induced in the core 120' and in the plates 42' and 44' to establish a fringing flux adjacent the line of abutment of the two plates which is sensible by the two sensing coils.

An alternative arrangement is schematically illustrated in FIG. 7. In this arrangement, it is assumed that two cup-shaped bells 132 and 134 are to be welded together to form a drum. The bells 132 and 134 are mounted upon an arbor 136 which is supported in trunnions defined by the two legs 138 and 140 of an electromagnet structure, further including a cross-piece 142 upon which an energizing coil 144 is mounted. The electrode assembly 38″ is supported adjacent the line of abutment of the two bells 132 and 134 and relative movement between those bells and the electrode assembly is accomplished not by moving the electrode along the line of abutment, as in the previous example, but rather by rotating the bells 132 and 134 about their axis. In the illustrated arrangement, this is accomplished by securing the two bells for rotation with the arbor 136 and by rotating that arbor as by means of a pulley 146 driven by a belt 148.

The head 36″ is supported for movement in a direction perpendicular to the plane of abutment of the two bells 132 and 134, and parallel with the axis of arbor 136, in any suitable fashion. For example, as illustrated, head 36″ may be slidably supported as by means of ways 150, upon a horizontal member 152 which is rigidly supported by means of an upright 154 upon a base plate 156 which is fixed with respect to the electromagnetic assembly including legs 138 and 140. A selectively energizable reversible motor 158 is supported upon the plate 156 to rotate a worm 160 to selectively drive a toothed wheel 162 in either direction of rotation about a shaft 164, which is fixed with respect to the members 152 and 154. A crank 163 is pivotally secured to the wheel 162 and to the head 36″. As a result, rotation of the motor 158 in one direction will rotate wheel 162 in one direction to move head 36″ left or right along the member 152, and reversing the motor will produce a reverse movement of the head 36″. The total rotation of wheel 162, in the illustrated arrangement, is, of course, only 90 degrees or so. The sensing coil assemblies 114″ and 116″ and the electrode will therefore be moved transversely with respect to the line of abutment between the two metal parts. The intensity of the respective fields sensed by the two coil assemblies will produce electrical signals which are transmitted via the indicated conductors to a control apparatus 168 which controls the selective energization of the motor 158.

A representative and presently preferred control circuit responsive to the sensing coils for controlling the driving mechanism is shown in FIG. 8 of the drawings. In that arrangement, the fringing flux field established about the line of abutment of the metallic parts 42″ and 44″ is derived from an electromagnetic structure including the core 120″ and the coil 124″ which is energized from an alternating current source 152. The intensity of the field to one side of the line of abutment of the plates 42″ and 44″ is sensed by sensing coil assembly 108″, while the intensity of the field at the other side of that line of abutment is sensed by sensing coil assembly 110″.

Sensing coil assembly 108″ is connected, by means of shielded cable 153 and a detachable connector assembly 155, to a choke-input low-pass filter network comprising an inductor 157 and a capacitor 161. The function of the network including elements 157 and 161 is to pass with minimum attenuation the currents which are induced in coil 108″ as a result of the changing magnetic field which is produced as a result of the energization of coil 124″ by alternating source 152, but to substantially attenuate any higher frequency currents which are induced in the sensing coils as a result of the arc welding operation. It has been found that during arc welding, spurious signals which are normally high in frequency relative to the preferred 60 cycle per second frequency of source 152 are induced in the sensing coil, which can adversely affect the operation of the equipment unless they are discriminated against as by means of the disclosed filter network.

The signal from the filter network is developed across grid resistor 165 and applied through resistor 167 to the control grid of a pre-amplifier triode 166. The cathode of that triode is connected to ground through self-biasing resistor 169 which is shunted by a capacitor 170 to reduce degenerative feed-back. The anode of triode 166 is connected to a source of plate potential through plate load resistor 172 and the resulting signal across that load resistor is impressed across a circuit comprising coupling capacitor 174, the portion of the resistive element of variable voltage divider 176 between its terminal 178 and slider 180, and the resistive element of variable voltage divider 176.

Similarly, the currents induced in the sensing coil assembly 110″ are applied through a corresponding filter network 184 to develop a voltage across grid resistor 186 which is applied through resistor 188 to the control grid of a pre-amplifying triode 190. The output signal from triode 190 is applied across a network comprising coupling capacitor 192, the portion of the resistive element of the variable voltage divider between terminal 194 and wiper 180, and the resistive element of variable voltage divider 182. If desired, capacitors 196 and 198 may be connected between terminals 178 and 194, respectively, and ground to further by-pass any spurious frequency signals.

The portion of the voltage appearing between the wiper 200 of variable voltage divider 182 and ground is applied to the control grid of amplifying triode 202. This signal is an "error" signal reflecting the direction of the deviation of the position of the electrode from the line of abutment of the metallic parts.

Coils 108″ and 110″ are connected so as to be in an out-of-phase relationship, that is, so that the alternating voltage appearing between terminal 178 and ground will be 180 degrees out-of-phase with the alternating voltage appearing between terminal 194 and ground. If under any given conditions the magnitude of the two out-of-phase voltages appearing between terminal 178 and ground and terminal 194 and ground are exactly equal in magnitude, no alternating voltage will be developed across the resistive element of variable voltage divider 182, and no input or "error" signal will be applied to triode 202, assuming proper adjustment of slider 180. It may be noted at this point that variable voltage divider 176 enables adjustment of the system to compensate for variations in the physical location of the sensing coils, in the characteristics of the two sensing coils, or in the characteristics of the filter and amplifying circuits for the two coils. Similarly, wiper 180 may be adjusted to adjust the lateral position of the electrode relative to the line of abutment of the workpiece. For example, if desired, the electrode may be made to follow a line which parallels the line of abutment of the two parts but which is spaced laterally therefrom by an amount determined by the setting of the wiper 180.

If, under other circumstances, the alternating voltage developed between terminal 178 and ground is greater in magnitude than the alternating voltage developed between point 194 and ground, an alternating voltage will be developed across the resistive element of variable voltage divider 182, and an error signal will be applied to the control grid of triode 202, which is in-phase with the voltage appearing between terminal 178 and ground. Conversely, if at another time, the alternating voltage appearing between terminal 194 and ground has a greater magnitude than the alternating voltage appearing between terminal 178 and ground, then the error signal will be in-phase with the voltage between terminal 194 and ground. The magnitude of the error signal voltage will, of course, vary with the average magnitude of the two alternating signals appearing between terminals 178 and 194 and ground.

The alternating voltage appearing at the control grid of triode 202 is amplified by that triode, and applied through a lowpass filter 204 of any suitable type to the control grid of amplifier 206. Filter network 204 is intended further to attenuate the spurious high frequency signals, and may, if desired, comprise a conventional treble attenuating tone control and may, if desired, be an element of a negative feed-back loop around triode 206.

It has been found that on occasion the operation of the arc will induce current spikes in the sensing coils recurring at a 60 cycle rate. Consequently, provision is made in the disclosed circuit for discriminating against spurious signals of that nature. The output signal from triode 206 is applied through capacitor 208 and via conductor 210 to a dual-diode clipper 212. The cathode of one section of the dual-clipper is connected to the conductor 210 and the anode of that section is connected to ground, so that conductor 210 cannot become negative relative to ground by more than the drop across that section of the dual diode. The anode of the other section of the tube 212 is connected to conductor 210 and its corresponding cathode is connected to a source of positive voltage of selected value. In the illustrated arrangement, this voltage is derived by connecting a variable voltage divider 214 across a source of plate potential 216. Consequently, the potential of conductor 210 cannot become positive relative to the selected positive value by more than the amount of the potential drop across that section of tube 212. The positive value is selected in the light of the amplitudes of the true (not spurious) error signals.

The resultant signal is coupled through capacitor 218 and resistor 220 to the control grid of triode 222, which is directly coupled to phase inverter or splitter 224. The two out-of-phase output signals from phase inverter or splitter 224 are applied to the control grids of power amplifying tubes 226 and 228. The cathode of amplifiers 226 and 228 are connected to ground through a by-passed, common, self-biasing resistor 230 and the anodes are connected to a suitable source of plate potential through the two halves of the primary winding of transformer 232. As a result, a signal is developed across the secondary winding of transformer 232 the phase of which is determined by the relative magnitude of the two alternating voltage signals appearing between terminal 178 and ground, and terminal 194 and ground. If desired, a negative feed-back loop, including network 234, may be connected from the secondary winding of transformer 232 to the cathode of triode 222, as illustrated.

The alternating voltage developed across the secondary winding of transformer 232 is applied across a resistor 236, one terminal of which is connected to the control grid of a thyratron 238, and the other terminal of which is connected to the control grid of a thyratron 240. This resistor properly loads the transformer 232. The cathodes of those two thyratrons are interconnected and are connected to one terminal of a source of alternating voltage 242. The other terminal of source 242 is connected to the anode of thyratron 238 through the winding of clutch 90, and is connected to the anode of thyratron 240 through the winding of clutch 92. The voltage supplied by source 242 should be of the same frequency as that of source 152 and preferably either in-phase or 180 degrees out-of-phase therewith, although if desired there may be other phase relationships between these voltages.

The voltage developed across source 242 is also applied across the primary winding of power transformer 244 and the alternating voltage developed across the secondary winding of that transformer is full-wave rectified by bridge rectifier 246. The resultant direct voltage is filtered by and developed across a network comprising capacitor 248 and the resistive element of a variable voltage divider 250 connected in parallel with one another. One terminal of the resistive element of variable voltage divider 250 is connected by means of conductor 252 to the cathodes of thyratrons 238 and 240, and the wiper of that variable voltage divider is connected to the center tap of the secondary winding of transformer 232. Since the ends of the secondary winding of transformer 232 are connected to the respective grids of thyratrons 238 and 240, a direct voltage is applied between the control grid and cathode of each of the two thyratrons to serve as an adjustable-magnitude, negative biasing voltage. Variable voltage divider 250, therefore, serves as a sensitivity control. Alternating voltages developed at the secondary winding of transformer 232 which are below a magnitude determined by the setting of variable voltage divider 250 are not effective to produce energization of either of the clutches 90 or 92, whereas, any voltage having having a magnitude greater than that selected value will produce energization of the appropriate one of the clutches.

In view of the connection of the center tap of the secondary winding of transformer 232 to the cathodes of the thyratrons 238 and 240, an alternating voltage signal developed across the secondary winding of transformer 232 will cause out-of-phase alternating voltages to be applied to the two control grids of the thyratrons 238 and 240. If the alternating voltage signal applied between the control grid and cathode of thyratron 238, under a given error signal condition, is in-phase with the plate voltage applied to that thyratron, thyratron 238 will conduct to energize clutch 90. Under that same condition, of course, the alternating voltage applied between the control grid and cathode of thyratron 240 will, of necessity, be out-of-phase with the plate voltage applied to that tube so that thyratron 240 cannot conduct and clutch 92 will not be energized. Under the opposite error signal condition, the input signals to the thyratrons will be of such phase that thyratron 240 will conduct and thyratron 238 will not be permitted to conduct, and clutch 92 will be energized and clutch 90 will not.

The energization of clutch 90 will result in movement of the head 36 (FIG. 2) to shift the position of the electrode and the sensing coils in a direction to tend to reduce the magnitude of the error signal, and this movement will continue until the error signal is reduced to the point where the magnitude of the voltage across the secondary winding of transformer 232 is insufficient to maintain conduction of thyratron 238, whereupon that thyratron will extinguish at the next negative half-cycle of the applied plate voltage and clutch 90 will become de-energized to terminate the movement of the head 36. Conversely, if the electrode is improperly positioned with respect to the line of abutment of the two plates in the opposite direction, so that the derived error signal is of the opposite phase, thyratron 240 (FIG. 8) will be fired to energize clutch 92 to move head 36 (FIG. 2) in the opposite direction to again correct the error.

Thyratrons 238 and 240 can be utilized to control a bi-directional motor to drive the head 36 if desired, or those thyratrons may control the driving means through relays if desired.

While various rate or anti-hunting circuits may be provided, if desired, a practicable embodiment of the invention constructed in accordance with the showing of FIG. 8 has proved to work satisfactorily without objectionable hunting.

In the preferred practice, the sources 152 and 242 (FIG. 8) are desirably sources of 60 cycle per second alternating voltage or any other commercial source, in view of the convenience of utilizing line voltage. It has been found that satisfactory results can be achieved in controlling the movement of the electrode along the line of abutment of non-ferrous plates, if the sources 152 and 242 are appreciably increased in frequency. High audiofrequencies, in the region of 10,000 cycles per second to 20,000 cycles per second, have been found to produce satisfactory results. Under those circumstances, it has been found to be advantageous to form the coils 108 and 110 (which are satisfactorily air-core coils for commercial line frequency use) with ferrite cores.

It may be noted that the disclosed mechanical and circuit arrangement is advantageous from the standpoint of reducing the effect of spurious signals produced as a result of the arc welding operation and of preventing improper operation of the apparatus in response to such signals. If, as is preferred, the two sensing coils are identical or substantially identical and if they are spaced equidistantly from the arc welding electrode (or if the sensing coil means are otherwise electrically balanced as, for example, by adjusting the distance from the coils to the electrode to compensate for difference between the coils) any spurious results from the arc welding operation will tend to be equally induced in both coils. Such equal signals will tend to be effectively balanced out in the disclosed bridge circuit. Alternatively, with differences between the coils and spacing, an equivalent result can be achieved by adjusting the variable voltage divider 182. In either case, if the electrode is aligned with the line of abutment, all signals, including those reflecting electrode position and those derived from the arc welding operation, will be effectively cancelled and no error signal will be produced. If the electrode deviates from the line of abutment, then the error signal will reflect primarily the difference between magnitudes of the two sensing coil currents (and a phase indication of the direction of the difference) and, again, the equal components, including the spurious, will tend to be cancelled out.

While it is possible to employ a direct-current energized electromagnet or a permanent magnet to induce the sensible field, such an arrangement not only leads to problems in developing an effective change of flux so that signal currents will be induced in the sensing coils (e.g., by physical vibration of the coils), but also the presence of the direct-current flux has been found to tend to distort the arc.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. Apparatus for moving a member parallel with an extended line of abutment of two metallic parts comprising means for establishing relative movement between the member and the metallic parts in a direction generally parallel with the line of abutment, means for establishing a fringing magnetic field adjacent the line of abutment, separate means for separately sensing the intensity of the magnetic field to each side of the line of abutment, and means controlled by said separate means for moving the member and said sensing means laterally with respect to the line of abutment.

2. Apparatus for moving a member parallel with an extended line of abutment of two metallic parts comprising means for establishing relative movement between the member and the metallic parts in a direction generally parallel with the line of abutment, means for establishing a fringing magnetic field adjacent the line of abutment, means for sensing the intensity of the magnetic field to each side of the line of abutment in the region of said line directly adjacent the member, and means controlled by said separate means for moving the member and said sensing means laterally with respect to the line of abutment.

3. The combination of claim 1, in which said means for establishing a fringing magnetic field includes electrical winding means energizable from a source of current for inducing flux in a path including the metallic parts and stray flux in the air adjacent the relatively high reluctance line of abutment.

4. The combination of claim 1, in which said fringing magnetic field is an alternating field and in which the intensity of said field is substantially symmetrical about the line of abutment of the metallic parts.

5. The combination of claim 1, in which said sensing means includes a pair of coils disposed laterally of and to opposite sides of the line of abutment.

6. The combination of claim 5, in which said coils are disposed on opposite sides of and generally aligned with said member along a line generally perpendicular to said line of abutment.

7. The combination of claim 5, in which said coils are generally annular, are mounted coaxially, and have their axes generally parallel to the metallic parts and generally perpendicular to the line of abutment.

8. The combination of claim 1, in which said means for establishing a fringing magnetic flux includes electrical winding means energizable from a source of alternating current for inducing flux in a path including the metallic parts and stray flux in the air adjacent the relatively high reluctance line of abutment.

9. The combination of claim 8, in which said electrical winding means is disposed upon a core mounted in fixed position with respect to the two metallic parts.

10. The combination of claim 8, in which said electrical winding means is disposed in flux inducing relationship with the two metallic parts and supported for movement with said member.

11. The combination of claim 10, in which said member, said separate means and said electrical winding means are disposed in pre-selectable fixed relationship with respect to one another.

12. Apparatus for moving a member parallel with an extended line of abutment of two metallic parts comprising means for establishing relative movement between the member and the metallic parts in a direction generally parallel with the line of abutment, means for establishing a fringing magnetic field adjacent the line of abutment, separate means for separately sensing the intensity of the magnetic field to each side of the line of abutment, means including sensing means for separately sensing the intensity of the magnetic field in regions to each side of the line of abutment for producing an electrical signal having a characteristic which varies in accordance with the difference of said intensities, and means responsive to said signal for moving said member laterally with respect to said line of abutment.

13. Apparatus for moving a member parallel with an extended line of abutment of two metallic parts comprising means for establishing relative movement between the member and the metallic parts in a direction generally parallel with said line of abutment, means for establishing a fringing magnetic field adjacent the line of abutment, separate means for separately sensing the intensity of the magnetic field to each side of the line of abutment, means including two separate sensing means for separately sensing the intensity of the magnetic field in regions to each side of the line of abutment for producing an electrical signal having one characteristic which varies from a selected value in accordance with the average magnitude of said intensities and another characteristic which varies in accordance with whichever of said sensing means is in a field of higher intensity, and means responsive to said signal for moving said member laterally with respect to said line of abutment in a direction determined by said other characteristic of said signal.

14. The combination of claim 12, in which said signal is an alternating current signal, in which said one characteristic is the amplitude of said signal, in which said other characteristic is the phase of said signal, and in which the member is moved laterally in response to said signal a distance sufficient to reduce said first characteristic of said signal to a selected value.

15. Control apparatus for controlling the position of an arc welding electrode in arc welding two abutting metallic parts along their line of abutment comprising means for establishing relative movement between the electrode and the metallic parts in a direction generally parallel with the line of abutment, electromagnetic means for establishing magnetic circuit including portions of the metallic parts and a fringing flux field symmetrical about the relatively high reluctance line of abutment, a pair of sensing coil means movable with and disposed on opposite sides of the electrode and disposed in the field of said fringing flux field to opposite sides of the line of abutment for generating currents in accordance with the intensity of the field adjacent the individual coils, means producing a signal derived from said currents and means responsive to said signal for driving the electrode and the sensing coil means laterally of the line of abutment.

16. The combination of claim 15, in which said electromagnetic means is energized from an alternating current source so that said fringing flux field fluctuates, in which the arc welding operation produces magnetic fields which fluctuate at rates majorly differing from the frequency of fluctuation of said fringing flux field, and in which means are provided for discriminating against currents produced by alternating magnetic fields which fluctuate at said rates.

17. The combination of claim 15, in which said electromagnetic means is energized from a relatively high frequency alternating current source so that the field of said fringing flux fluctuates at a relatively high frequency.

18. The combination of claim 15, in which said electromagnetic means is energized from an alternating current source, in which said means responsive to said signal includes a pair of electron discharge devices each having an anode, a cathode and a control electrode, means for applying an alternating voltage between the cathode and control electrode of each of said devices having a characteristic determined by said signal and having a frequency determined by the frequency of said source, and means for applying between the anode and cathode of each of said devices an alternating voltage in phase with and having a frequency equal to the frequency of said source.

19. The combination of claim 15, in which said means responsive to said signal includes a shaft, an electric motor for driving said shaft in one direction, first differential gearing means connected to said shaft for concurrently driving two output shafts therefrom in opposite directions of rotation, second differential gearing means including two input shafts and an output shaft and effective to drive said output shaft in a direction of rotation determined by which of said two input shafts is driven, and electromechanical clutch means connecting each of said output shafts of said first differential gearing means to a respective one of said input shafts of said second differential gearing means alternatively energizable in response to a characteristic of said signal, and means driven by said output shaft of said second differential gearing means for moving the electrode and the sensing coil laterally of the line of abutment.

20. The combination of claim 15, in which each of said sensing coil means is mounted within a non-ferrous tube for shielding said sensing coil from the arc.

21. The combination of claim 20, in which said non-ferrous tube is longitudinally slotted over the length thereof.

22. Control apparatus for controlling the position of an arc welding electrode in arc welding two abutting metallic parts along their line of abutment comprising means for establishing relative movement between the electrode and the metallic parts in a direction generally parallel with the line of abutment, electromagnetic means for establishing a fluctuating magnetic circuit including portions of the metallic parts and a fringing flux yield symmetrical about the relatively high reluctance line of abutment, a pair of sensing coil means movable with and disposed on opposite sides of the electrode and disposed in said fringing flux field to opposite sides of the line of abutment for generating currents in accordance with the intensity of the field adjacent the individual coils, and means responsive to the average amplitude of said currents for driving the electrode and the sensing coil means laterally of said line in a direction determined by the relatvie amplitudes of said currents.

23. Control apparatus for controlling the position of an arc welding electrode in arc welding two abutting metallic parts along their line of abutment comprising means for establishing relative movement between the electrode and the metallic parts in a direction generally parallel with the line of abutment, electromagnetic means for establishing magnetic circuit including portions of the metallic parts and a fringing flux field symmetrical about the relatively high reluctance line of abutment, a pair of sensing coil means movable with and disposed on opposite sides of the electrode and disposed in the field of said fringing flux field to opposite sides of the line of abutment for generating currents in accordance with the intensity of the field adjacent the individual coils, substantially equal-magnitude currents tending to be induced in said sensing coil means when the electrode is aligned with said line of abutment, substantially equal-magnitude, spurious currents tending to be induced in said sensing coil means as a result of the arc welding operation, means for producing a control signal derived from the difference between the currents in said pair of sensing coil means, and means responsive to said control signal for driving the electrode and the sensing coil means laterally of the line of abutment.

24. The combination of claim 23 in which said sensing coil means are similar to one another and are disposed substantially equidistant from the arc welding electrode.

25. The combination of claim 23 in which said control signal is derived by connecting said sensing coil means so that their respective currents are out of phase with one another and by applying said currents across a network.

26. Control apparatus for controlling the position of an arc welding electrode in arc welding two abutting metallic parts along their line of abutment comprising means for establishing relative movement between the electrode and the metallic parts in a direction generally parallel with the line of abutment, electromagnetic means for establishing magnetic circuit including portions of the metallic parts and a fringing flux field symmetrical about the relatively high reluctance line of abutment, a pair of sensing coil means movable with and disposed on opposite sides of the electrode and disposed in the field of said fringing flux field to opposite sides of the line of abutment for generating currents in accordance with the intensity of the field adjacent the individual coils, high-amplitude, abrupt-wave-form spurious currents tending to be induced in said sensing coil means as a result of the arc welding operation, means producing a signal derived from all of said currents, means for reducing the magnitude of the peaks of said signal resulting from said high-amplitude spurious currents comprising limiter means for producing a limted-amplitude control signal, and means responsive to said control signal for driving the electrode and the sensing coil means laterally of the line of abutment.

References Cited in the file of this patent

UNITED STATES PATENTS

| | | |
|---|---|---|
| 2,590,091 | Devol | Mar. 25, 1952 |
| 2,921,179 | Anderson | Jan. 12, 1960 |
| 2,971,079 | Sommeria | Feb. 7, 1961 |
| 3,017,496 | Greene | Jan. 16, 1962 |

FOREIGN PATENTS

| | | |
|---|---|---|
| 774,517 | Great Britain | May 8, 1957 |